United States Patent
Chang

[19]

[11] Patent Number: 5,949,354
[45] Date of Patent: Sep. 7, 1999

[54] COMPUTER POINTING DEVICE

[75] Inventor: Hsu Hung Chang, Taipei Hsien, Taiwan

[73] Assignee: Acer Peripherals, Inc., Taoyuan, Taiwan

[21] Appl. No.: 09/005,556

[22] Filed: Jan. 12, 1998

[30] Foreign Application Priority Data

May 10, 1997 [TW] Taiwan .................................. 86106220

[51] Int. Cl.$^6$ ................................................. H03M 11/00
[52] U.S. Cl. .............................. 341/33; 341/20; 345/161; 200/6 A; 74/471 XY
[58] Field of Search ................... 341/33, 20; 24/471 XY; 200/6 A; 345/101

[56] References Cited

U.S. PATENT DOCUMENTS

| | | |
|---|---|---|
| 4,739,299 | 4/1988 | Eventoff et al. . |
| 4,810,992 | 3/1989 | Eventoff . |
| 4,864,295 | 9/1989 | Rohr .................................. 340/870.37 |
| 4,879,556 | 11/1989 | Duimel ...................................... 341/20 |
| 4,961,055 | 10/1990 | Haib ........................................ 324/662 |
| 4,963,702 | 10/1990 | Yaniger et al. . |
| 5,002,241 | 3/1991 | Tizac .................................. 74/471 XY |
| 5,053,585 | 10/1991 | Yaniger . |
| 5,068,499 | 11/1991 | Kuratani ................................... 200/6 A |
| 5,140,320 | 8/1992 | Gerbier ..................................... 341/20 |
| 5,160,918 | 11/1992 | Saposnik ............................ 74/471 XY |
| 5,421,694 | 6/1995 | Basker .................................... 200/6 A |
| 5,468,924 | 11/1995 | Naiton .................................... 200/6 A |
| 5,576,704 | 11/1996 | Baker ....................................... 341/20 |
| 5,661,235 | 8/1997 | Bonin ....................................... 73/105 |
| 5,689,285 | 11/1997 | Asher ...................................... 345/161 |
| 5,786,997 | 7/1998 | Hoyt ....................................... 364/190 |

*Primary Examiner*—Michael Horabik
*Assistant Examiner*—Albert K. Wong
*Attorney, Agent, or Firm*—Winston Hsu

[57] ABSTRACT

The present invention provides a computer pointing device which uses capacitors installed in various directions to generate pointing signals. The pointing device comprises a circuit board, a cap, and a detecting unit. The circuit board comprises a center point, a first conducting plate installed in a first direction and a second conducting plate installed in a second direction. The cap is movably installed above the center point of the circuit board. The bottom side of the cap has a top conducting plate which forms first and second capacitors with the first and second conducting plates separately. The detecting unit is electrically connected to the top, first and second conducting plates to detect the capacitance of the first and second capacitors and generate corresponding pointing signals to reflect the position of the cap in the first and second directions.

12 Claims, 3 Drawing Sheets

COMPUTER POINTING DEVICE

BACKGROUND OF THE INVENTION

1. Field of the Invention

The present invention relates to a computer pointing device, and more particularly, to a computer pointing device which uses capacitors installed in various directions to generate pointing signals.

2. Description of the Prior Art

Pointing devices are commonly used for controlling movements of a cursor or an object on a computer screen. Several types of pointing devices such as mouse, track ball, digitizer, joystick, point stick, etc., are currently sold in the market. Compared with other pointing devices, the point stick is very small and can be easily installed on a keyboard. A point stick usually comprises an upward protruding handle and a plurality of pressure sensitive resistors corresponding to various directions disposed under the handle for sensing a tilted direction of the handle. When the handle is tilted toward one direction, the resistance of these resistors will be changed accordingly. And the resistance of all the resistors will be detected and converted into pointing signals to reflect the tilted direction and exerted pressure of the handle. The pointing signals will be used to control movements of a cursor shown on a monitor screen.

The drawback of the above mentioned point stick is that it uses the pressure sensitive resistors to sense the tilted direction and exerted pressure of the handle. The moving speed of the cursor is made proportional to the pressure exerted on the handle. Such design makes it quite difficult to accurately control the moving speed of a cursor by using a finger because the finger force exerted on the handle can not be accurately controlled by a user. Besides, the pressure sensitive resistor may be damaged after a long period of use which will affect its capability in accurately sensing the force exerted on the handle.

SUMMARY OF THE INVENTION

It is therefore a primary objective of the present invention to provide a pointing device which uses capacitors installed in various directions to sense the tilted direction of its handle so that the above mentioned problems caused by the pressure sensitive resistors can be solved.

In a preferred embodiment, the present invention provides a pointing device comprising:

a circuit board having a center point and a first conducting plate installed next to the center point in a first direction;

a cap movably installed above the center point of the circuit board, the cap comprising a bottom side having a top conducting plate installed under it wherein the top conducting plate and the first conducting plate form a first capacitor; and a detecting unit electrically connected to the top conducting plate and the first conducting plate for detecting the capacitance of the first capacitor and generating corresponding pointing signals;

wherein when the cap is tilted, the distance between the top conducting plate and the first conducting plate will be changed which will also change the capacitance of the first capacitor, and the detecting unit will generate the pointing signals according to the detected capacitance. The cap comprises a downward protruding stub on its bottom side which is stuck to the center point wherein the cap can be tilted toward various directions with the stub stuck to the center point. The cap further comprises a circular plate and an upward protruding handle installed at the center of the circular plate for tilting the cap toward various directions.

It is an advantage of the present invention that the handle of the pointing device can be tilted toward various directions to change the capacitance of the capacitors installed under the handle, and the moving speed of the cursor is completely determined by the tilted angle of the handle. It is much easier for a user to control the tilted angle of the handle than to exert accurate pressure on the handle. Besides, the pressure sensitive resistors are replaced by the capacitors so that the above mentioned problem caused by the pressure sensitive resistors is solved.

This and other objectives and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

Please refer to FIG. 1 to FIG. 4. FIG. 1 is a perspective view of a pointing device 10 according to the present invention. FIG. 2 is a sectional view along line 2—2 of the pointing device 10. FIG. 3 is a top view of a circuit board 12 of the pointing device 10. And FIG. 4 is a bottom view of a cap 14 of the pointing device 10.

Figure 1:
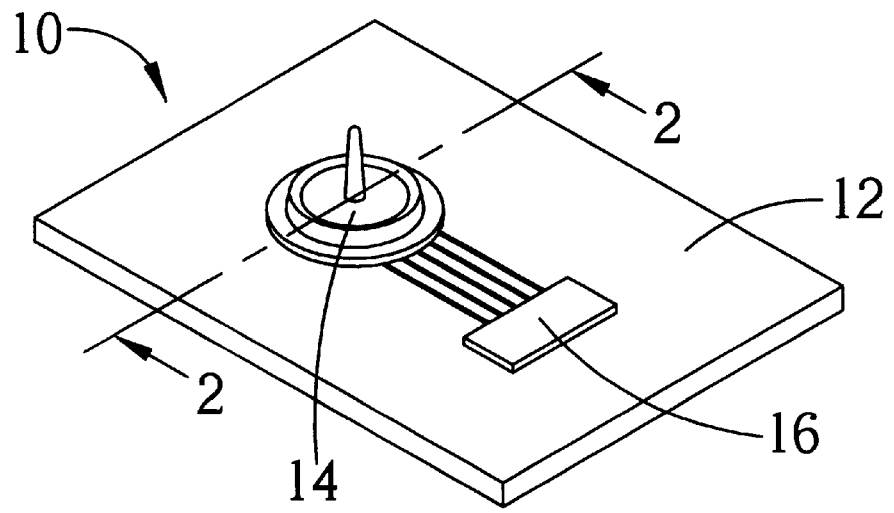
FIG. 1 is a perspective view of a pointing device according to the present invention.
Figure 2:
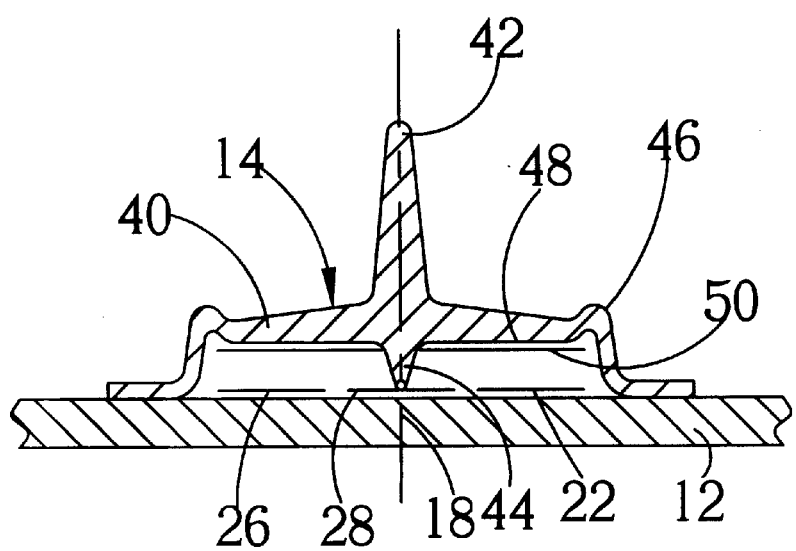
FIG. 2 is a sectional view along line 2—2 of the pointing device shown in FIG. 1.

The pointing device 10 comprises a circuit board 12, a detecting unit 16, and a plastic cap 14 movably installed above the circuit board 12. The circuit board 12 has a center point 18, and two mutually perpendicular coordinate axes X and Y intersecting at the center point 18. The circuit board 12 comprises a first conducting plate 20 installed at the +X direction of the center point 18, a second conducting plate 22 installed at the +Y direction of the center point 18, a third conducting plate 24 installed at the −X direction of the center point 18, a fourth conducting plate 26 installed at the −Y direction of the center point 18, and a bottom conducting plate 28 installed over the center point 18. The conducting plates 20, 22, 24, 26, and 28 are electrically connected to the detecting unit 16 through corresponding connecting wires 30, 32, 34, 36 and 38. All the conducting plates and connecting wires installed on the upper surface of the circuit board 12 are made of copper foil which is produced by using a copper foil corrosion method. Tin or gold can further be electroplated to the surface of the copper foil to protect it against oxidation.

The cap 14 is made of plastic material. It is movably installed above the center point 18 of the circuit board 12. The cap 14 comprises a rigid circular plate 40, a flexible periphery portion 46 connected to the circumference of the circular plate 40 for movably mounting the circular plate 40 onto the circuit board 12, an upward protruding handle 42 installed at the center of the circular plate 40, and a downward protruding stub 44 installed under the circular plate 40 which is stuck to the center point 18 of the circuit board 12. The handle 42 is positioned above the center point 18 and can be tilted toward various directions with the stub 44 stuck to the center point 18. The periphery portion 46 of the cap 14 functions like a spring for maintaining the handle 42 in an upright position.

Figure 3:
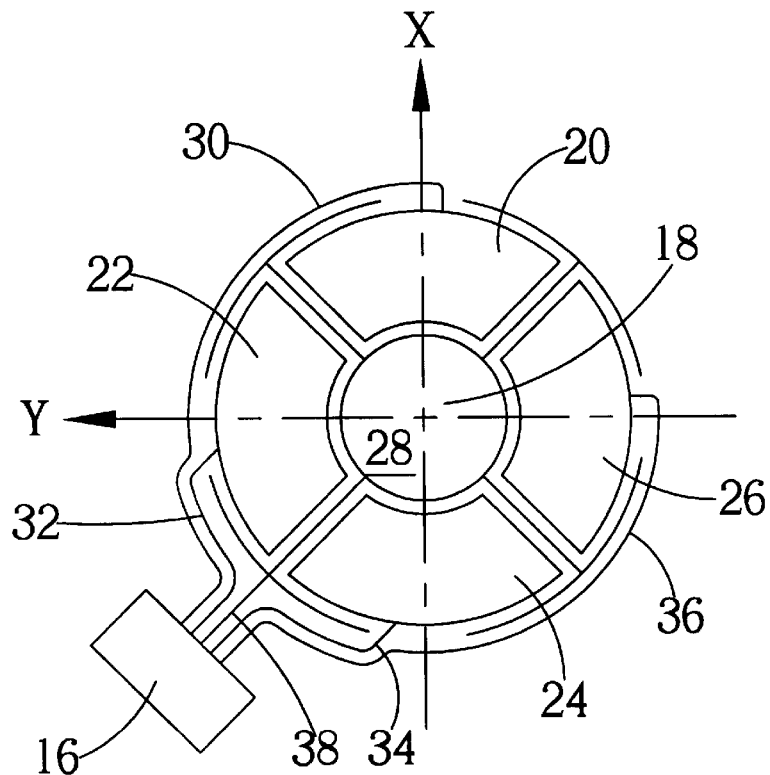
FIG. 3 is a top view of the circuit board shown in FIG. 1.
Figure 4:
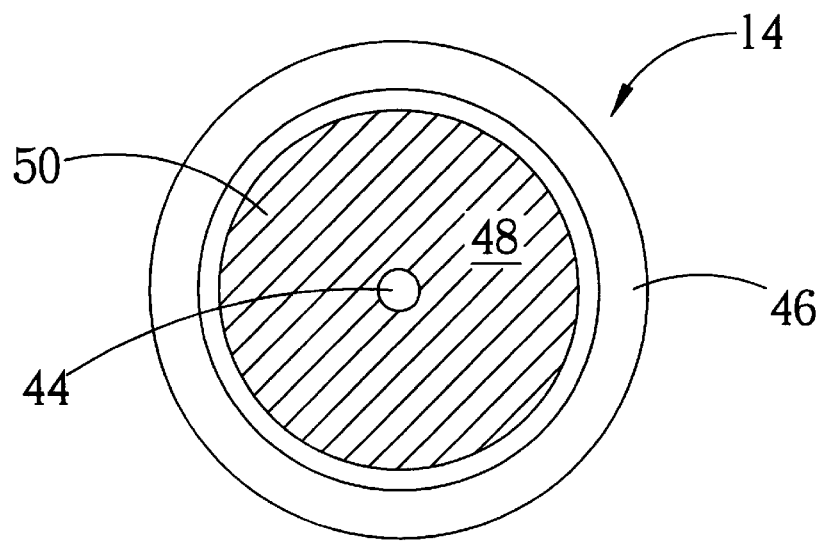
FIG. 4 is a bottom view of the cap shown in FIG. 1.

The top conducting plate 50 is installed on the bottom surface 48 of the circular plate 40, and it is positioned above the first conducting plate 20, second conducting plate 22, third conducting plate 24, fourth conducting plate 26, and bottom conducting plate 28 shown in FIG. 3. The top conducting plate 50 is made of conducting material such as aluminum foil, and its surface is coated with an insulating layer to isolate it from the conducting plates 20, 22, 24, 26 and 28 of the circuit board 12. The top conducting plate 50 forms a capacitor C1 with the first conducting plate 20, a capacitor C2 with the second conducting plate 22, a capacitor C3 with the third conducting plate 24, a capacitor C4 with the fourth conducting plate 26, and a connecting capacitor C0 with the bottom conducting plate 28. Each of the capacitors C1, C2, C3, and C4 is separately connected with the connecting capacitor C0 in series. An equivalent circuit 52 of these five capacitors is shown in FIG. 5.

The two conducting plates of each capacitor C1,C2,C3,C4 and C0 are in parallel with each other when the handle 42 is in an upright position. The capacitance of each capacitor is proportional to the sizes of its two conducting plates, and inversely proportional to the distance between its two conducting plates. When the handle 42 is tilted toward one of the four directions +X, +Y, −X and −Y, the capacitance of the capacitor in the tilted direction will be increased because the top conducting plate 50 will get closer to the conducting plate installed on the circuit board in the tilted direction. On the contrary, the capacitance of the capacitor in the opposite direction will be decreased because the distance between its two conducting plates will be increased. By detecting the capacitance of the four capacitors C1, C2, C3 and C4, the tilted direction and tilted angle of the handle 42 can be obtained.

The tilted angle of the handle 42 in the tilted direction can be used to control moving speed of a cursor shown in a monitor screen. That means the greater the tilted angle, the faster the cursor moving speed. As shown in FIG. 3, the conducting plates 20, 22, 24 and 26 are installed in four mutually perpendicular directions X, Y, −X, and −Y around the center point 18. By detecting the capacitance of the capacitors C1, C2, C3, and C4, the tilted angles of the cap 14 in X and Y directions can be calculated.

Figure 5:
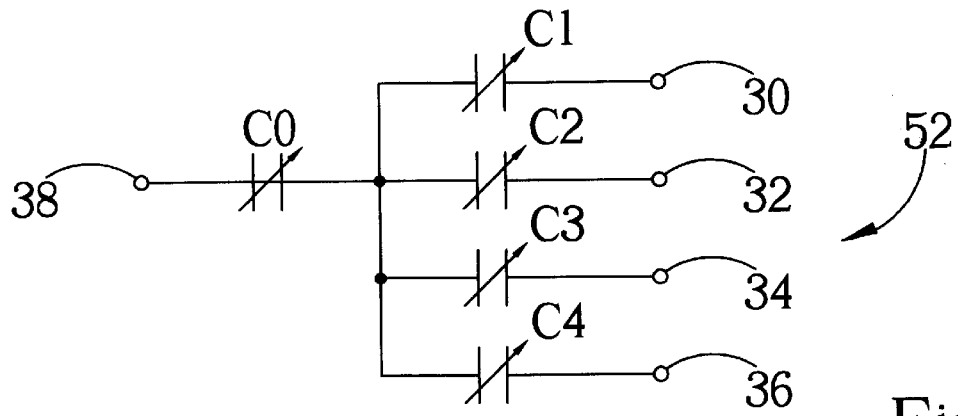
FIG. 5 is a circuit diagram of the capacitor portion of the pointing device shown in FIG. 1.

Please refer to FIG. 5. FIG. 5 is a circuit diagram of the capacitor portion of the pointing device 10 shown in FIG. 1. These five capacitors are variable capacitors over which the capacitance of each capacitor will be determined by the distances between the top conducting plate 50 under the cap 14 and the conducting plates 20, 22, 24, 26, and 28 on the circuit board 12. The bottom conducting plate 28 is uniformly installed over the center point 18 of the circuit board 12. Its average distance to the top conducting plate 50 will not vary significantly when the handle 42 is tilted, thus the capacitance of the capacitor C0 can be treated as a constant. The capacitors C1, C2, C3 and C4 are also uniformly installed in four mutually perpendicular directions around the capacitor C0, they have the same capacitance when the handle 42 is in an upright position. The capacitors C1,C2,C3 and C4 are connected in series with the connecting capacitor C0 separately which form four corresponding serial capacitors C10, C20, C30, and C40. The capacitance of each of the four serial capacitors C10, C20, C30 and C40 is:

C10=C1*C0/(C1+C0)

C20=C2*C0/(C2+C0)

C30=C3*C0/(C3+C0)

C40=C4*C0/(C4+C0)

The capacitance C10, C20, C30, and C40 of these four serial capacitors C1, C2, C3 and C4 can be sequentially measured by the connecting wires 30–38, 32–38, 34–38 and 36–38 respectively. Since C0 is a constant, the capacitance of the capacitors C1, C2, C3 and C4 can be calculated from:

C1=C10*C0/(C0−C10)

C2=C20*C0/(C0−C20)

C3=C30*C0/(C0−C30)

C4=C40*C0/(C0−C40)

When the cap 14 is tilted, the distances between the top conducting plate 50 and the conducting plates 20, 22, 24, 26 will be changed accordingly. Therefore, the capacitance of C10, C20, C30, C40 is changed due to the distance variation between the top conducting plate 50 and the conducting plates 20, 22, 24, 26. After detecting the capacitance of C10, C20, C30, C40, the capacitance of the capacitors C1, C2, C3 and C4 are obtained from the above four equations, and the tilted angle and direction can also be found.

Figure 6:
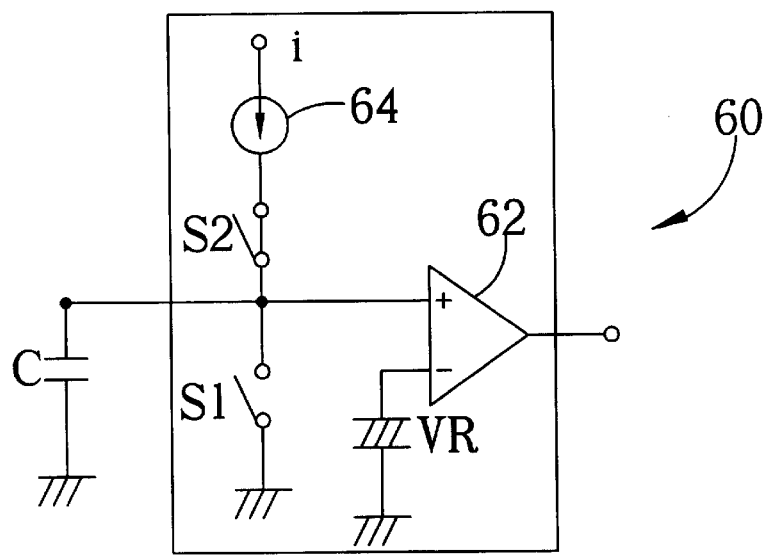
FIG. 6 is a circuit diagram of a capacitance detecting circuit used in the detecting unit shown in FIG. 1.

Please refer to FIG. 6. FIG. 6 shows a capacitance detecting circuit 60 used in the detecting unit 16 shown in FIG. 1 for detecting the capacitance of a capacitor C. The capacitance detecting circuit 60 comprises an operational amplifier 62 having a negative port connected to a reference voltage Vr and a positive port connected to a capacitor C, a current source 64 for supplying current i to the capacitor C, a switch S2 connected between the current source 64 and the capacitor C, and another switch S1 for discharging the capacitor C.

Before detecting the capacitance of the capacitor C, the switch S2 is disconnected and the switch S1 is connected to discharge the capacitor C to 0 volt. When detecting the capacitance C, the switch S1 is disconnected and the switch S2 is connected so that the current source 64 can start charging the capacitor C. In the mean time, a timer (not shown) will be initiated to count the charging period of the capacitor C. When the voltage of the capacitor C reaches the reference voltage Vr, an output signal will be generated by the operational amplifier 62 to stop the timer so that the charging period of the capacitor C can be obtained. Since the current i is a constant, the charging period of the capacitor C is proportional to its capacitance and thus the capacitance of the capacitor C can be calculated according to its charging period.

Figure 7:
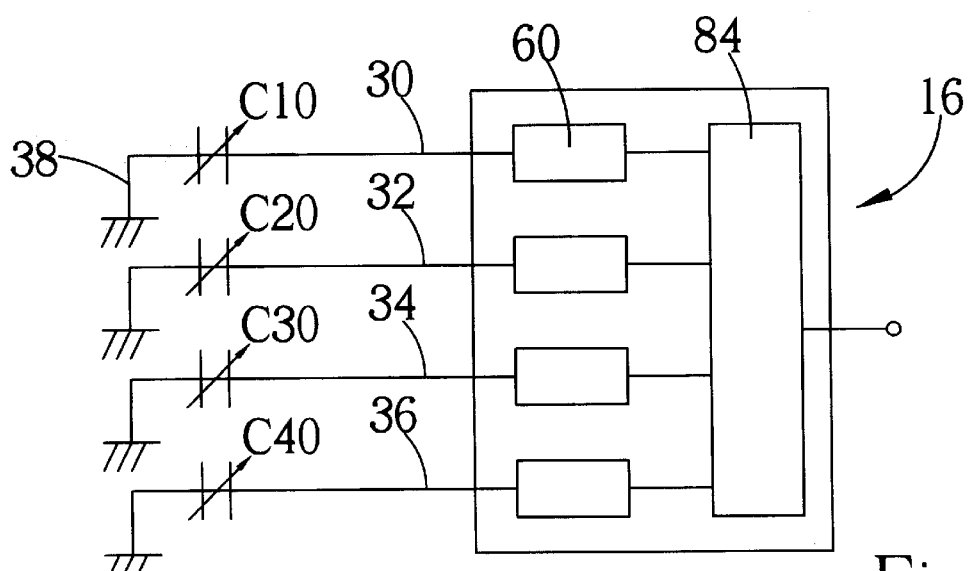
FIG. 7 shows a circuit diagram of the detecting unit shown in FIG. 1.

Please refer to FIG. 7. FIG. 7 shows a circuit diagram of the detecting unit 16 shown in FIG. 1. The detecting unit 16 is connected to capacitors C10, C20, C30 and C40 through the connecting wires 30, 32, 34, 36 and 38 respectively, and each capacitor is connected to a capacitance detecting circuit 60 for detecting the capacitance of each capacitor. The detecting unit 16 further comprises a control circuit 84 wired to each capacitance detecting circuit 60 for controlling the detection of the capacitance of the four capacitors C10, C20, C30 and C40 and generating corresponding pointing signals according to the detected capacitance. The capacitance of the four capacitors C10, C20, C30 and C40 will be detected one by one by the control circuit 84. And the pointing signals generated according to the detected capacitance will be transmitted to a computer (not shown) connected with the detecting unit 16 for controlling movements of a cursor. The detecting unit 16 will measure the capacitance of the four capacitors C10, C20, C30 and C40 periodically to determine the tilted direction and tilted angle of the handle 42. The frequency may vary from 20 Hz to 60 Hz, depending on the requirements of various computer applications.

The capacitors on the pointing device 10 can be arranged in many different ways. For example, it can comprise only one capacitor C1 or two capacitors C1 and C3 so that only the movements of the handle 42 along X direction can be detected. The number of capacitors can also be increased to six or eight capacitors so that movements of the handle 42 can be more accurately detected. Besides, the bottom conducting plate 28 can be removed and the top conducting plate 50 will be directly connected by using the connecting wire 38.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing device comprising:

a circuit board having a center point and a first conducting plate installed next to the center point in a first direction;

a cap movably installed above the center point of the circuit board, the cap comprising a bottom side having a top conducting plate installed under it wherein the top conducting plate and the first conducting plate form a first capacitor; and a detecting unit electrically connected to the top conducting plate and the first conducting plate for detecting the capacitance of the first capacitor and generating corresponding pointing signals;

wherein when the cap is tilted, the distance between the top conducting plate and the first conducting plate will be changed which will also change the capacitance of the first capacitor, and the detecting unit will generate the pointing signals according to the detected capacitance.

2. The pointing device of claim 1 wherein the cap comprises a downward protruding stub on its bottom side which is stuck to the center point wherein the cap can be tilted toward various directions with the stub stuck to the center point.

3. The pointing device of claim 1 wherein the cap further comprises a circular plate and an upward protruding handle installed at the center of the circular plate for tilting the cap toward various directions.

4. The pointing device of claim 1 wherein the circuit board further comprises a bottom conducting plate installed over the center point which forms a connecting capacitor with the top conducting plate and the connecting capacitor is in series with the first capacitor wherein the detecting unit is electrically connected with the bottom conducting plate and the first conducting plate for detecting the capacitance of the serially connected first capacitor and connecting capacitor.

5. The pointing device of claim 1 wherein the circuit board further comprises a second conducting plate installed next to the center point in a second direction wherein the second conducting plate and the top conducting plate form a second capacitor, and wherein the detecting unit is electrically connected to the second conducting plate to detect the capacitance of the second capacitor and the detected capacitance of the first and second capacitors are converted into the pointing signals by the detecting unit to reflect the position of the cap in the first and second direction.

6. The pointing device of claim 5 wherein the second direction is perpendicular with the first direction.

7. The pointing device of claim 5 wherein the second direction is opposite to the first direction.

8. The pointing device of claim 1 wherein the detecting unit detects the capacitance of the first capacitor within a predetermined time period.

9. A pointing device comprising:

a circuit board having a center point, a first conducting plate installed next to the center point in a first direction, a second conducting plate installed next to the center point in a second direction, and a bottom conducting plate installed over the center point;

a cap movably installed above the center point of the circuit board, the cap comprising a bottom side having a top conducting plate installed under it, the top conducting plate being positioned above the first conducting plate, the second conducting plate, and the bottom conducting plate wherein a first capacitor is formed between the top conducting plate and the first conducting plate, a second capacitor is formed between the top conducting plate and the second capacitor, and a connecting capacitor is formed between the top conducting plate and the bottom conducting plate, the first and second capacitors being in series with the connecting capacitor separately, the serially connected first capacitor and connecting capacitor defining a first serial capacitor, the serially connected second capacitor and connecting capacitor defining a second serial capacitor; and a detecting unit electrically connected to the first conducting plate, second conducting plate and bottom conducting plate for detecting the capacitance of the first and second serial capacitors and generating corresponding pointing signals;

wherein when the cap is tilted, the distances between the top conducting plate and the first and second conducting plates will be changed which will also change the capacitance of the first and second serial capacitors, and the detecting unit will generate the pointing signals according to the detected capacitance of the first and second serial capacitors to reflect the position of the cap in the first and second directions.

10. The pointing device of claim 9 wherein the second direction is opposite to the first direction.

11. The pointing device of claim 9 wherein the second direction is perpendicular with the first direction.

12. The pointing device of claim 11 wherein the circuit board further comprises a third conducting plate installed next to the center point and opposite to the first direction, a fourth conducting plate installed next to the center point and opposite to the second direction, the third and fourth conducting plates forming third and forth serial capacitors with the top and bottom conducting plates respectively, and wherein the detecting unit is separately connected with the third and fourth conducting plates to detect the capacitance of the third and fourth serial capacitors and generate the pointing signals according to the detected capacitance of the first, second, third and forth serial capacitors to reflect the position of the cap in the four directions.

* * * * *